Figure 7:
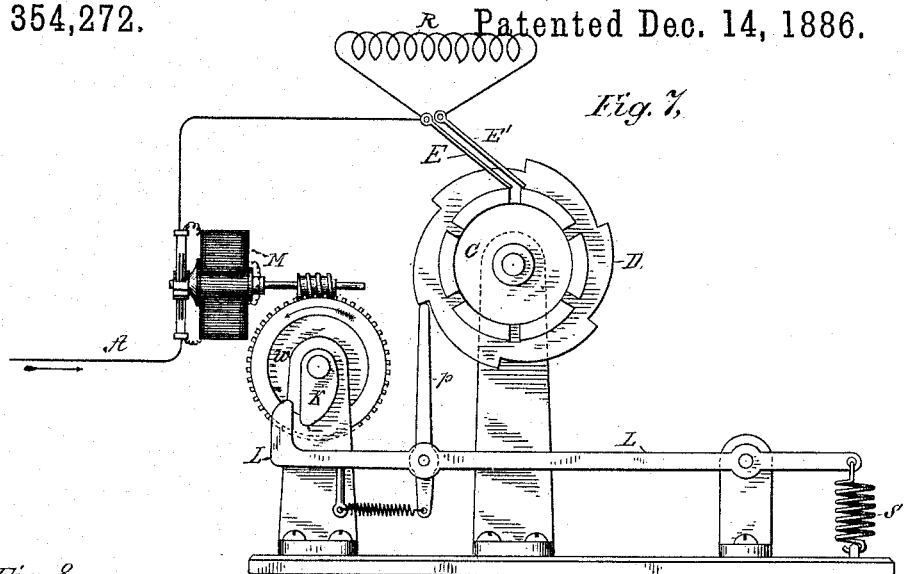

(No Model.) 2 Sheets—Sheet 1.
E. THOMSON.
APPARATUS FOR THE DISTRIBUTION OF ELECTRICITY BY MEANS OF SECONDARY BATTERIES.
No. 354,272. Patented Dec. 14, 1886.
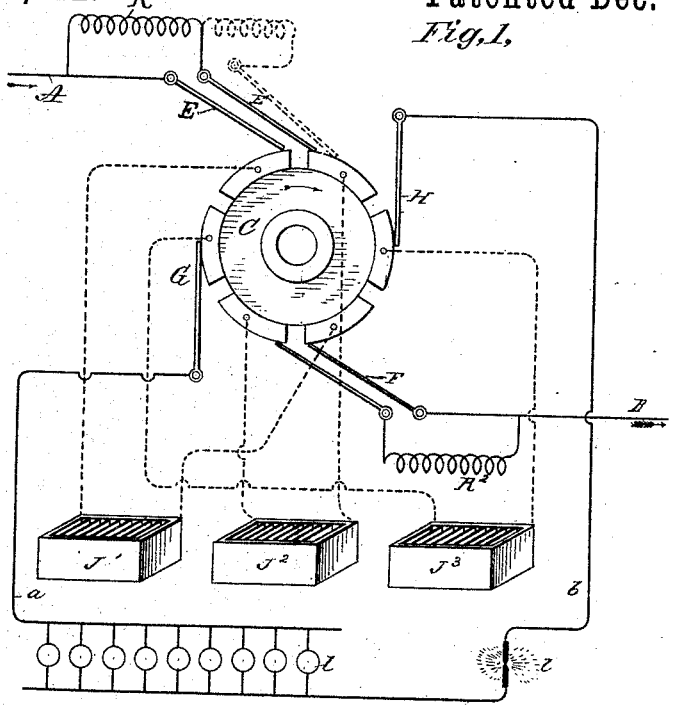
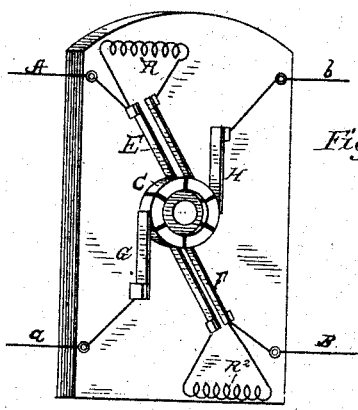
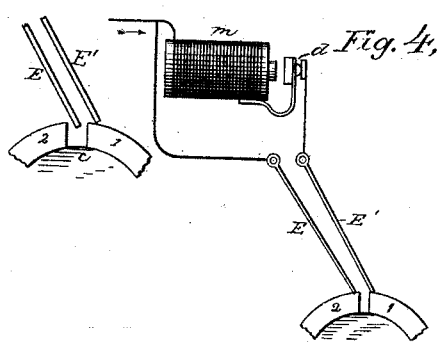
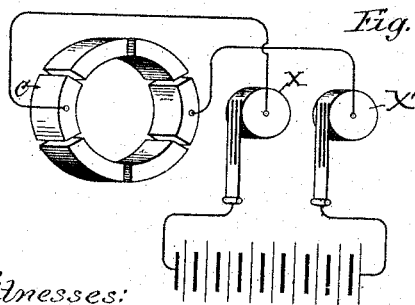
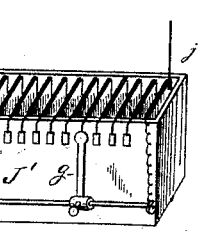
Witnesses:
Ernest Abshagen
Thos. Toomey
Inventor:
Elihu Thomson
By his Attorney: H. C. Townsend (No Model.) 2 Sheets—Sheet 2.

E. THOMSON.
APPARATUS FOR THE DISTRIBUTION OF ELECTRICITY BY MEANS OF SECONDARY BATTERIES.

No. 354,272. Patented Dec. 14, 1886.

Witnesses:
Ernest Abshagen
Thos. Toomey

Inventor:
Elihu Thomson
By his Attorney: H. C. Townsend

UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

APPARATUS FOR THE DISTRIBUTION OF ELECTRICITY BY MEANS OF SECONDARY BATTERIES.

SPECIFICATION forming part of Letters Patent No. 354,272, dated December 14, 1886.

Application filed January 3, 1884. Serial No. 116,309. (No model.)

*To all whom it may concern:*

Be it known that I, ELIHU THOMSON, a citizen of the United States, and a resident of Lynn, in the county of Essex and State of Massachusetts, have invented certain new and useful Improvements in Apparatus for the Distribution of Electricity by Means of Secondary Batteries, of which the following is a specification.

My invention relates, generally speaking, to the distribution of electricity for electric lighting, motive power, and other purposes, and its aim is to provide an apparatus whereby a current may be continuously transferred from a conductor or main carrying a current of very high electro-motive force—say two thousand volts or more at the generator or source—to a local or sub-circuit or line in which the electro-motive force shall be less—say eighty to one hundred volts, or other amount—so that said local line may be employed with entire safety to feed incandescent lamps in dwellings or stores, motors scattered at various points on the line, or arc lamps of varying power, as need be.

In carrying out my invention I propose to make use of secondary batteries combined with the main or charging conductor and with the sub-circuits in the manner hereinafter described, said batteries being in continuous succession connected alternately to the main to receive a charge and to the local to supply current thereto.

The aim of my invention is, among other things, to permit the disuse of a portion or the whole of the electricity upon such local or sub-circuits without loss of energy from the connection of such battery to the main before it has parted with its charge, and consequent overcharge of the same.

To this end my invention consists in connecting the secondary to the main line, first in one direction and then in the other, so that if, after receiving a charge and being connected to the local, said battery shall not discharge, it shall be connected into the main line, so as to re-enforce the current in the main. The reversal of the connection with the main line may take place with every connection, or said battery may be connected for a number of times in the same direction, and at its next connection with the main be connected in reverse manner.

The object of my invention is also to prevent loss from the discharge of a battery which has just received a charge into a battery that has at the instant of disconnection of the first been connected with the main line. This is liable to occur, for the reason that in my system I contemplate a continuous connection of the main line to the secondary batteries, one or the other, and such continuity of connection presupposes a connection of a fresh battery before the disconnection of the battery which has received a charge takes place. I overcome this difficulty by automatically breaking the connection from one battery to the other in case there be a flow of current from one to the other at the instant of change. The break of connection may be effected by means of an electro-magnet or other device which will respond to the flow of the electric current.

My invention also has for its object to provide for an absolute isolation of the main and sub circuits; and to this end it consists in so constructing the commutator or circuit-shifter by which the requisite changes of connection are made that each battery, after receiving a charge, shall be open-circuited before being connected to the sub or local circuit.

My invention consists, also, in certain combinations whereby the various objects of the invention are effected, the nature of which combinations will be described and shown, and will be then specified in the claims.

In carrying out my invention I generally prefer to employ three or more sets of secondary batteries; but some of my improvements are applicable to cases where a less number of batteries is employed. I have, however, herein described and claimed combinations into which "three or more batteries" enter as an element, since in the matter of providing for open-circuiting of the batteries successively, while at the same time allowing of a continuity of connection of the main and of the sub circuit with a battery, such feature possesses great advantages.

Generally speaking, my invention consists in combining two, three, or more sets of secondary battery-cells of low resistance, and not necessarily of large capacity of storage, with a circuit-shifting switch device for putting said sets of cells successively to line, open-circuiting them, putting to local, and again open-circuiting them, putting back to line, and so on. While one is on line another is on local, and another may be open-circuited during the transfer from main to local.

To avoid loss from overcharging of the batteries, they may at intervals have their connection with the line reversed. The reversal may be made at every connection, or may occur only after a number of connections with the same terminals of the battery to the positive and negative of the line have taken place. The various actions are accomplished by a circuit-shifter or commutator of any desired mechanical construction, which is best made rotary, though not necessarily.

The commutator may be driven by clockwork at a predetermined speed, or by a small electric motor or similar means. Its motion may be a steady rotation; but it is preferably moved intermittently or by sudden change of position. The commutator, although described as rotary, may be made in other equivalent ways giving the same results. The charge received by each set of cells is retained but an instant and carried at once to the local. If the local be unused or but little used, the current stored is returned to the main circuit, owing to the reversal or changing of the poles of the battery, and with small loss, due chiefly to resistance of the cells, which resistance may be made very low.

The cells are required to be nothing more than sheets of lead or the like immersed in acid liquor, and since their contacts to line and to local may succeed each other quickly, their surface charge is sufficient; hence the cells are of the cheapest possible construction and cannot be injured by overcharge. All the parts of the switch are thoroughly insulated from one another and protected from moisture. The cells used may be arranged so that any or all of each series may be cut out or rendered idle, so as to control the electro-motive force supplied to the locals. The main-line current is kept of constant volume, preferably, and maintained so by regulation at the generating source in any known way. The number of elements coupled in each set of cells will depend on the electro-motive force required upon the local lines.

In Fig. 1, A B is the main line, having a constant current of high potential, coming from any source. Interposed in this line anywhere is a switching or connecting device, C, shown here as rotary and as composed of six segments or plates of a conducting-ring with insulating-slots between them. Upon opposite sides of this ring bear brushes or springs E F, connecting with the main line A B, and at a position nearly at right angles are brushes G H, connecting to a local line or circuit upon which lights, motors, &c., $l\ l$ are to be worked. To opposite segments on C are connected, respectively, the terminals of sets of accumulators or storage-cells $J'\ J^2\ J^3$. The connections are made, as well understood in the art, so that C may revolve without disturbing them. To moderate the passage over the slots by the brushes E F, at the same time to have the brushes bear on their tips, as shown, so as to pass the slots suddenly, a pair of brushes is used, one of the pair placed ahead of the other, and the two united by a resistance, $R\ R^2$, whose amount may be made to suit the condition of working. Three or more brushes in each set can be similarly used with still better results. This is indicated by dotted lines at E.

If only a single brush were employed, there would be a momentary break in the main circuit every time a brush passed a slot, and the apparatus would be liable to injury from sparks at the points of breaking. By the construction shown these effects are avoided.

In the position shown, which is the point at which one battery, $J^2$, having received a charge, is in process of being switched out of connection with the main line, and a fresh or discharged battery, $J'$, has just been thrown into circuit to receive a charge, both batteries are simultaneously connected to line and to the brushes, so that there is at the period of change an interval during which the batteries are connected. This is clearly shown in Figs. 1 and 7 of the drawings. As the commutator moves on, the connection of $J^2$ with the line is severed, and it remains open-circuited until by the further movement its segments are brought into connection with G H. In the position of the parts shown the battery $J^3$ is feeding the local circuit, after which it will be carried around and reconnected to main line, receive a reverse charge, and be put to local again. There will thus be a continuous abstraction of current from main line and a continuous discharge into local without any electrical connection between them. When the parts are in the position shown, it is obvious that battery $J^2$ might discharge into $J'$ unless provision were made to prevent it. This difficulty is to a great extent avoided by reason of the fact that the interposed resistance $R\ R^2$ cuts off the flow of current.

In Fig. 4 a substitute for the resistance R is shown. The object in employing this device and the resistances $R\ R^2$ is to prevent a battery that has just received a charge from discharging into a battery that has already parted with its charge. The liability to such discharge arises from the fact that in the operation of the apparatus it is necessary to provide a path for the main-line current at all times, and in order to prevent interruption of the main-line circuit the commutator-plate connected to an uncharged battery, or one that is moving forward preparatory to connection with the main line, must be connected therewith at the moment before or at the instant that the plate connected to the battery which has received its charge leaves the main-line brush or brushes. If there were an instant of time during which a connection to neither battery existed, the main line would obviously be ruptured. To prevent this the commutator must be made a continuity-preserving one—that is, there must be for an instant at the point of change a simultaneous connection of two successive plates to the line. It is at this instant that the charged battery may discharge into the fresh or uncharged battery. To prevent this discharge, if there be any tendency in this direction, the brush E' is arranged to be disconnected at contact $d$ whenever the magnet $m$ is actuated by current. This will be when there is a tendency for current to pass from E' to E, which occurs for an instant when the brushes are on the slot, as shown—one on one segment, the other on another. The obvious reason is the tendency of a charged set of cells to equalize charge with the succeeding or uncharged set. The armature of the magnet $m$ is, however, instantly drawn, so as to open $d$ at the instant of any flow of current from E' to E.

The mounting of the brushes is illustrated in Fig. 2. In Fig. 3 the tripping of a brush, E, over a slot is indicated. It leaves one segment, 1, and quickly passes into contact with 2.

Fig. 5 illustrates a way of permitting C to revolve while maintaining the connection to the batteries. It consists, simply, of two conducting-rings, $x\ x'$, individually connected to opposite segments of C, and having brushes bearing on them connected to the terminals of a battery. The rings $x\ x'$ revolve with C. It is sometimes advisable to have the electromotive power of the cells variable.

In Fig. 6 a sliding switch, $g$, is arranged to be in permanent connection with one terminal, $j$, of a set of cells, J'. Connections from each cell are arranged so that the switch $g$ may make contact with them in succession, and thus vary the number of cells in use.

In Fig. 7 mechanical devices are shown capable of giving the preferable motions to C. Clock-work could be used to rotate it at a uniform or intermittent rate, and I sometimes make use of it. The intermittent movement is best when arranged to cause the slots in C to pass the brushes E suddenly, diminishing the possibility of short-circuit of the cells through these brushes. Connected with C is a ratchet wheel or disk, D, having the same number of teeth as there are slots in C. A lever, L, and pawl $p$ are adapted to move said ratchet D at intervals. A worm-wheel, W, is driven by any suitable device, but preferably by a small electric motor, M, energized by the current supplied by the main circuit, either before or after its passage through the secondary batteries. In the present case the motor is connected in the main circuit, its armature and its field-magnet being in multiple arc, as indicated. Wheel W rotates a cam, K, or other device, acting during revolution to depress the lever L intermittently. After passing a certain point, the lever L, being suitably formed, slips the cam and rises quickly, (as it is shown doing,) being actuated by a spring, S. The pawl $p$ now acts to throw D around, at the same time causing the slot in C to pass E quickly. The wheel W may be given motion in other ways to effect the results, as may also the lever L. The rate of movement may be made greater or less, according to the capacity of the storage-cells—less when the latter is great, and vice versa.

Figure 8:
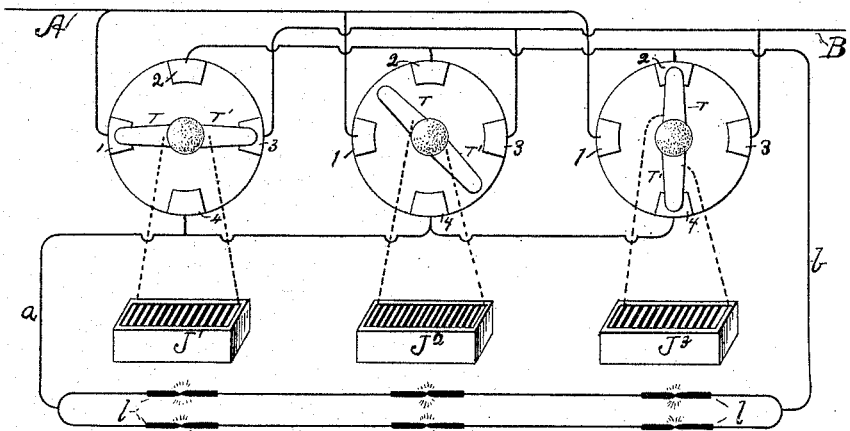

Fig. 8 shows an arrangement the equivalent of that shown in Fig. 1. In this case the two terminals of each battery are connected, respectively, to insulated contact springs or arms T T', of which there are as many pairs as there are batteries. The three pairs T T' revolve together, and are disposed with relation to one another, as shown, at equal distances apart in the circle which their contact-points describe. They may be mounted on the same shaft or on separate shafts, and connection with them may be maintained by the well-known means before described, consisting of continuous revolving rings or surfaces revolving with and separately connected to the arms, and fixed springs connected to the battery terminals and bearing on said rings. The contact-blocks 1 2 3 4, with which the arms make contact successively, are connected with the main and the sub circuits, as shown, and the effect is as with the arrangement already described. To successively and in turn connect the batteries to the main circuit, open-circuit them and then connect them to the sub-circuit.

Figure 9:
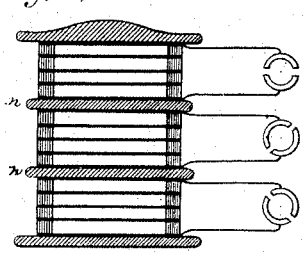

In Fig. 9 is shown how the sets of cells may be mounted one above the other and insulated by interposed plates $n\ n$, of insulating material.

Figures 10, 11:
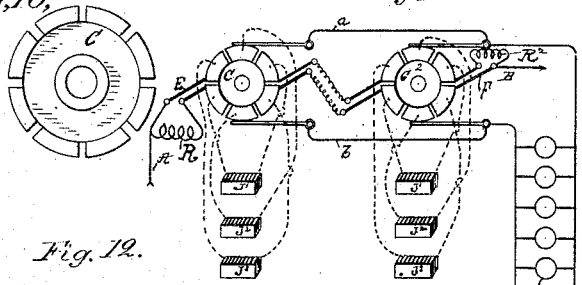

In Fig. 10 the commutator-switch C is shown, and consists of eight segments, in which case four sets of cells will be used. Five or more might be similarly employed.

In Fig. 11 I have indicated two switches, C C², having their main-line brushes connected so that the current will pass through them in series, while their local brushes are connected so as to supply current to the local circuit for quantity.

Figure 12:
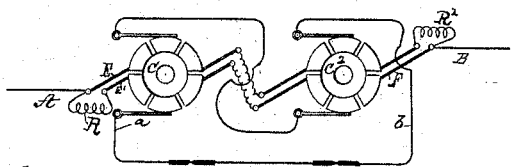

In Fig. 12 the local brushes are shown connected in series, so as to supply current to the local circuit for intensity.

Other arrangements will readily occur to those skilled in the art.

By my invention the advantages of high electro-motive force energy for distribution over large areas or distances are preserved, while the advantages of low potential or local lines are also secured.

The invention is also applicable to other conditions, such as arise in electric railroading, to feed from a very high potential main a series of sections of road, each having its individual distributing-main kept at lower potential, so as to be secure from leakages.

What I claim as my invention is—

1. The combination, substantially as described, of a main or charging circuit, a local or sub circuit, a secondary battery, and a pole-changing commutator, whereby the connection of said battery to the charging-circuit may alternately or at intervals be reversed and the current unused on the local or sub circuit may be returned to the main circuit.

2. In a system of electric distribution comprising a main or charging circuit, a sub-circuit, and a secondary battery or batteries which are put alternately to line and to the sub-circuit, a continuously-operating circuit-shifter for alternating or reversing the connection of the secondary battery with the line at intervals, as and for the purposes described.

3. In a system of electrical distribution, a main or charging circuit, a sub-circuit containing working-resistances, in combination with three or more secondary batteries, a commutator, and connections to each battery, as described, whereby the batteries are successively first connected individually to the charging-circuit, then open-circuited, and afterward connected to the working-circuit.

4. The combination of an electric circuit, a series of secondary batteries, a continuity-preserving commutator or circuit-shifter, and means for substantially breaking the connection between the batteries at the point of change in the commutator upon a flow of current through such connection, whereby a charged battery may at such point be prevented from discharging into an uncharged or weakened battery.

5. The combination of a charging-circuit, a sub-circuit, a commutator having three or more pairs of commutator plates or segments, and three or more sets of batteries, each connected with one pair of commutator-plates, and all in turn connected to the charging-circuit, and afterward first open-circuited and then connected to the sub-circuit.

6. The combination of a main or charging circuit, a continuity-preserving commutator whereby the connection of said circuit with two or more batteries is controlled, and an electro-magnet and circuit-breaker in the circuit completed between the batteries at the moment of bringing one battery into connection with the main circuit to receive a charge and disconnecting the battery that has received a charge.

7. The combination of a main or charging circuit, two or more batteries to be charged thereby, and a constantly-operated continuity-preserving circuit-shifter for connecting the batteries to the charging-circuit in turn, said circuit-shifter being combined with means for giving it an accelerated movement at the instant of change, as and for the purpose described.

8. The combination, with two or more secondary batteries and a sub-circuit to which said batteries are connected in turn, of a constantly-operated continuity-preserving circuit-shifter and commutator, combined with means for giving said circuit-shifter an accelerated movement at the point of change, as and for the purpose described.

Signed at Lynn, in the county of Essex and State of Massachusetts, this 28th day of December, A. D. 1883.

ELIHU THOMSON.

Witnesses:
W. O. WAKEFIELD,
E. B. DOERE.